L. A. LONGLEY.
HEADLIGHT FOR AUTOMOBILES.
APPLICATION FILED FEB. 21, 1916.
1,210,504.
Patented Jan. 2, 1917
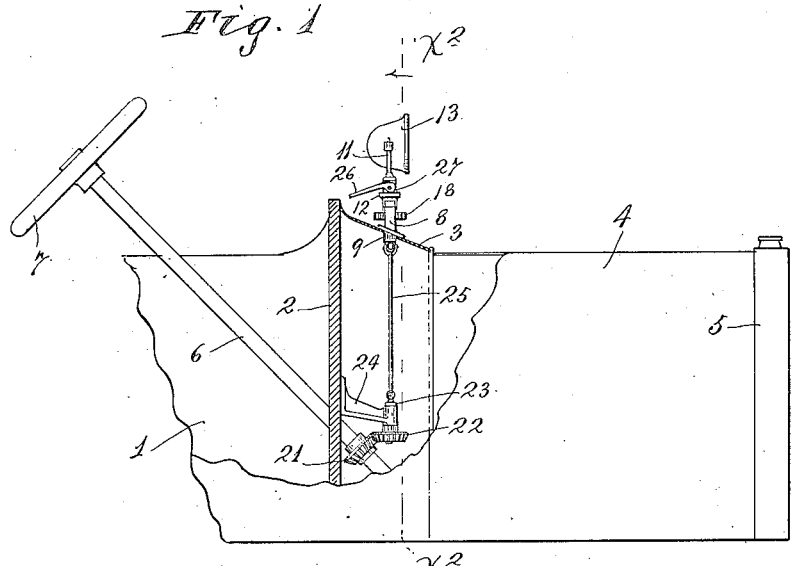
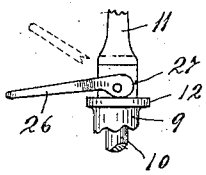
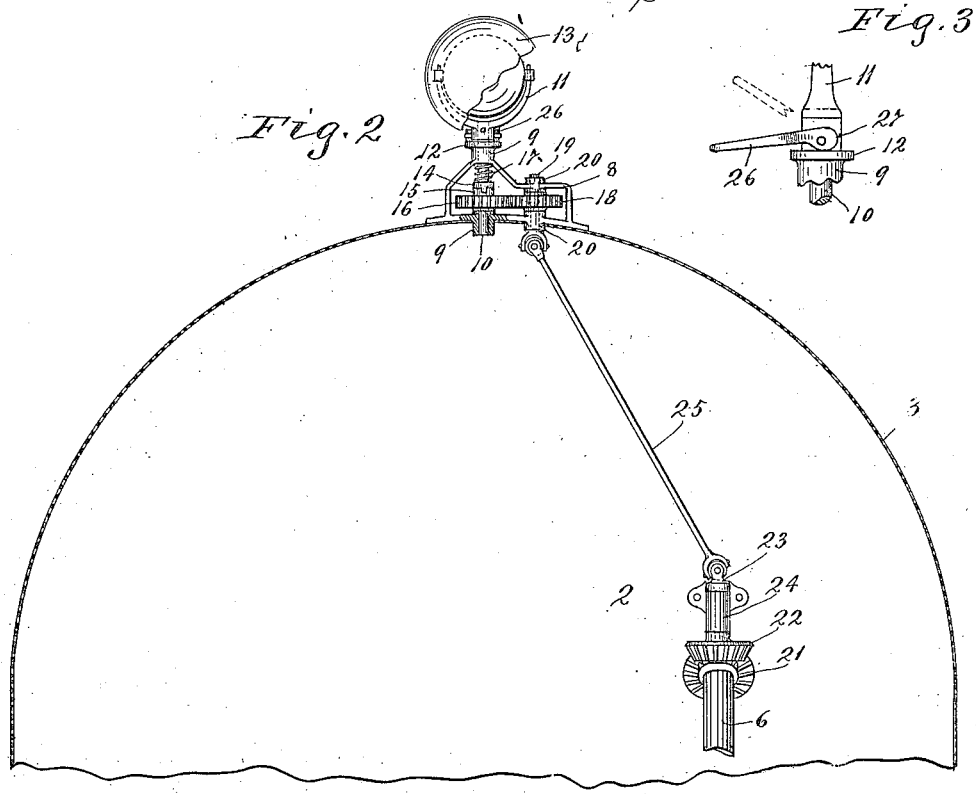
Witnesses
A. H. Opsahl
G. F. Williamson
Inventor
Lester A. Longley
By his Attorneys
Williamson & Merchant

UNITED STATES PATENT OFFICE.

LESTER A. LONGLEY, OF LITTLE FALLS, MINNESOTA.

HEADLIGHT FOR AUTOMOBILES.

1,210,504.   Specification of Letters Patent.   Patented Jan. 2, 1917.

Application filed February 21, 1916. Serial No. 79,603.

*To all whom it may concern:*

Be it known that I, LESTER A. LONGLEY, a citizen of the United States, residing at Little Falls, in the county of Morrison and State of Minnesota, have invented certain new and useful Improvements in Headlights for Automobiles; and I do hereby declare the following to be a full, clear, and exact description of the invention, such as will enable others skilled in the art to which it appertains to make and use the same.

My invention relates to improvements in headlights for automobiles; and, to this end, generally stated, it consists of the novel devices and combinations of devices hereinafter described and defined in the claim.

In the accompanying drawings, which illustrate the invention, like characters indicate like parts throughout the several views.

Referring to the drawings, Figure 1 is a fragmentary side elevation of the body of an automobile, some parts being shown in section; Fig. 2 is a transverse section taken on the line $x^2$ $x^2$ of Fig. 1, on an enlarged scale; and Fig. 3 is a fragmentary detail view of the lever disengaging and operating the headlight, with respect to the steering column.

Of the parts of the automobile illustrated, it is important to note the body 1, instrument board or dash 2, cowl 3, hood 4, radiator 5, steering column 6 and steering wheel 7.

Rigidly secured to the cowl 3, at the transverse center of the machine, is a bracket 8 having a pair of vertically spaced bearings 9 and in which is journaled a shaft 10, having keyed to its upper end a lamp bracket 11, the hub of which rests on an annular flange 12 integrally formed with the upper bearing 9. A headlight 13 is detachably supported on the prongs of the bracket 11. Keyed to the shaft 10 is a half clutch 14, which normally interlocks with a half clutch 15 on a spur gear 16, loosely journaled on the shaft 10 and resting on the lower bearing 9. Compressed between the upper bearing 9 and the clutch member 14, is a coiled spring 17 which surrounds the shaft 10 and yieldingly holds said clutch member interlocked with the clutch member 15. A spur pinion 18 meshes with the spur gear 16 and its shaft 19 is journaled in a pair of vertically spaced bearings 20 integrally formed with the bracket 8.

Keyed to the steering column 6, is a bevel gear 21 which meshes with a bevel gear 22 keyed to a shaft 23 journaled in a bearing 24 secured to the dash 2. A universal shaft 25 connects the shaft 19 to the shaft 23. The above described connections are arranged to turn the headlight 13 from the steering column 6 in the direction the vehicle is about to turn. Preferably, the connections are geared to turn the headlight a little faster than the movement of the steering column, so as to light up a winding road or a long turn therein. By mounting the headlight on the cowl 3, the same is up high enough to cast a light over small bushes and weeds that usually line the sides of country roads.

During the day and when the headlight is not in use, the same may be disconnected with respect to the steering column 6, by lifting the clutch member 14 out of engagement with the clutch member 15. This is accomplished by a lever 26 having a bifurcated end, the prongs of which embrace the lower portion of the bracket 11, are fulcrumed thereto and have cam surfaces 27, which bear upon the flange 12 of the bracket 8. By lifting on the free end of the lever 26, its cam surfaces 27, acting on the flange 12, will lift the shaft 10 sufficiently to disengage the clutch members 14 and 15. With said clutch members disengaged, the headlight may be operated by the lever 26 independently of the steering column 6. Obviously, the lever 26 is within easy reach of the driver and the clutch members may be disengaged, at will, and the headlight 13 operated by said lever. While in the drawings, the lever 26 must be lifted to disengage the clutch members, it is, of course, understood that it might be arranged to operate in reverse order.

The above described device being very simple may readily be applied to any automobile, and a large part of the mechanism thereof is located within the cowl. In actual practice, the mechanism above the cowl will be inclosed in a casing.

What I claim is:—

The combination with an automobile having a steering column, of a bracket mounted on the vehicle, a gear journaled on the bracket, connections from the steering column for oscillating the gear, a shaft, a headlight carried by the shaft, a clutch normally connecting said shaft and gear, and a cam lever for disconnecting said clutch, supporting the headlight and oscillating the shaft, at will.

In testimony whereof I affix my signature in presence of two witnesses.

LESTER A. LONGLEY.

Witnesses:
N. E. CARY,
J. W. JARBOE.